(12) United States Patent
Angrish et al.

(10) Patent No.: US 7,945,893 B2
(45) Date of Patent: May 17, 2011

(54) MAPPING WEB SERVICES DESCRIPTION LANGUAGE DOCUMENTS TO XQUERY FUNCTIONS

(75) Inventors: Rohan Angrish, Redwood City, CA (US); Muralidhar Krishnaprasad, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1254 days.

(21) Appl. No.: 11/545,932

(22) Filed: Oct. 10, 2006

(65) Prior Publication Data

US 2008/0098346 A1 Apr. 24, 2008

(51) Int. Cl.
*G06F 9/44* (2006.01)
(52) U.S. Cl. ............................................. 717/106
(58) Field of Classification Search .................. None
See application file for complete search history.

(56) References Cited

U.S. PATENT DOCUMENTS

| | | | |
|---|---|---|---|
| 4,930,071 A | 5/1990 | Tou et al. |
| 5,414,812 A | 5/1995 | Filip et al. |
| 5,499,371 A | 3/1996 | Henninger et al. |
| 5,546,584 A | 8/1996 | Lundin et al. |
| 5,761,656 A | 6/1998 | Ben-Shachar |
| 5,848,273 A | 12/1998 | Fontana et al. |
| 5,875,334 A | 2/1999 | Chow et al. |
| 5,935,210 A | 8/1999 | Stark |
| 6,085,198 A | 7/2000 | Skinner et al. |
| 6,226,649 B1 | 5/2001 | Bodamer et al. |
| 6,684,207 B1 | 1/2004 | Greenfield et al. |
| 2002/0174417 A1 | 11/2002 | Sijacic et al. |
| 2002/0184401 A1 | 12/2002 | Kadel et al. |
| 2003/0018402 A1 | 1/2003 | Breunese |
| 2003/0025737 A1 | 2/2003 | Breinberg |
| 2004/0111464 A1 | 6/2004 | Ho et al. |

OTHER PUBLICATIONS

Nicola Onose et al., "XQuery at Your Web Service", May 2004, ACM, pp. 603-611.*
The Common Object Request Broker: Architecture and Specification, pp. 11-1 through 11-7, Jul. 1995.
n/a, "COM/CORBA Interworking RFP Part A," OMG TC Document 95.8.19, pp. 17-40, Aug. 1995.
Yellin et al., "Interfaces, Protocols, and the Semi-Automatic Construction of Software Adaptors," ACM, pp. 176-190, Oct. 1994.
Steven Bobrowski, "Oracle7 Server Concepts Manual", Dec. 1992, pp. 11-1-11-9.

* cited by examiner

*Primary Examiner* — Wei Zhen
*Assistant Examiner* — Lanny Ung
(74) *Attorney, Agent, or Firm* — Hickman Palermo Truong & Becker LLP

(57) ABSTRACT

Using a WSDL document to exchange an interface definition for back-end business logic includes automatically mapping various elements of the WSDL document to corresponding XQuery elements to generate an XQuery interface definition "skeleton". From such an XQuery interface skeleton, an XQuery statement can be generated by filling in the body of the function that implements the logic. The XQuery statement serves as an interface definition for an interface to the function. Furthermore, at runtime a Web Service request that is based on the WSDL document can be translated into an XQuery call into an XQuery function that implements the logic defined in the WSDL document. From there, results are obtained from the XQuery function, translated into the appropriate return format defined in the WSDL, and returned.

24 Claims, 3 Drawing Sheets

---

RECEIVE A WSDL DOCUMENT THAT DEFINES AN INTERFACE TO A CERTAIN OPERATION
202

AUTOMATICALLY GENERATE, BASED ON THE WSDL DOCUMENT, A SET OF ONE OR MORE XQUERY STATEMENTS WHICH, WHEN EXECUTED, FUNCTION AS THE INTERFACE TO THE CERTAIN OPERATION
204

US 7,945,893 B2

MAPPING WEB SERVICES DESCRIPTION LANGUAGE DOCUMENTS TO XQUERY FUNCTIONS

FIELD OF THE INVENTION

The present invention relates generally to data management and, more specifically, to techniques for mapping Web Services Description Language (WSDL) document content to XQuery functions.

BACKGROUND

The Web Services Description Language (WSDL), which is sometimes referred to as Web Services Definition Language, is an XML format for describing network services as a set of endpoints operating on messages containing either document-oriented or procedure-oriented information. WSDL is described in "Web Services Description Language (WSDL) 1.1, W3C Note 15 Mar. 2001" available from the World Wide Web Consortium (W3C); the entire content of which is incorporated by reference in its entirety for all purposes as if fully disclosed herein. WSDL provides a well-defined standard for distribution and use of information contained within a WSDL document.

The XQuery language is described in "XQuery 1.0: An XML Query Language, W3C Working Draft 4 Apr. 2005" available from the W3C organization; the entire contents of which are incorporated by reference for all purposes as if fully disclosed herein. XQuery is a popular programming language for querying XML data sources. In addition to providing for extraction of data from an XML data source, XQuery may also be used to facilitate XML data manipulations and transactional operations via, for example, XQuery functions. XQuery is designed to be a language in which statements are concise and easily understood. XQuery is also flexible enough to use with a broad spectrum of XML information sources, including both databases and documents. XQuery operates on the abstract, logical structure (i.e., the data model) of an XML document, rather than its surface syntax. Thus, the XQuery language provides an option in which programmers can develop business logic for applications and services.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Embodiments

Techniques are described herein for using WSDL documents as a means for exchanging interface definitions or descriptions for interfacing with back-end business logic. For example, a WSDL document can be used to exchange an interface definition for an XQuery module instead of using XQuery itself to exchange such an interface definition. Various elements of the WSDL document are automatically mapped to corresponding XQuery elements to generate an XQuery interface "skeleton". From such an XQuery interface skeleton, an XQuery statement can be generated by filling in the body of the function that implements the logic. Hence, the XQuery statement serves as an interface definition or description for an interface to the function.

Furthermore, a WSDL document can be used similarly to a functional specification for one or more operations, whereby the WSDL document is effectively used to define XQuery functions corresponding to the one or more operations. For example, a WSDL document defines a call to a particular operation and exposes the business logic of the particular operation. Thus, if one wanted to implement the particular operation in XQuery, then the WSDL document can be used to generate an XQuery interface to an XQuery implementation of a function corresponding to the operation. Hence, at runtime, a Web Service request that is based on the WSDL document can be translated into an XQuery call into the XQuery implementation of the operation. From there, results are obtained from the XQuery function, translated into the appropriate return format defined in the WSDL, and returned.

Functional Environment

Figure 1:
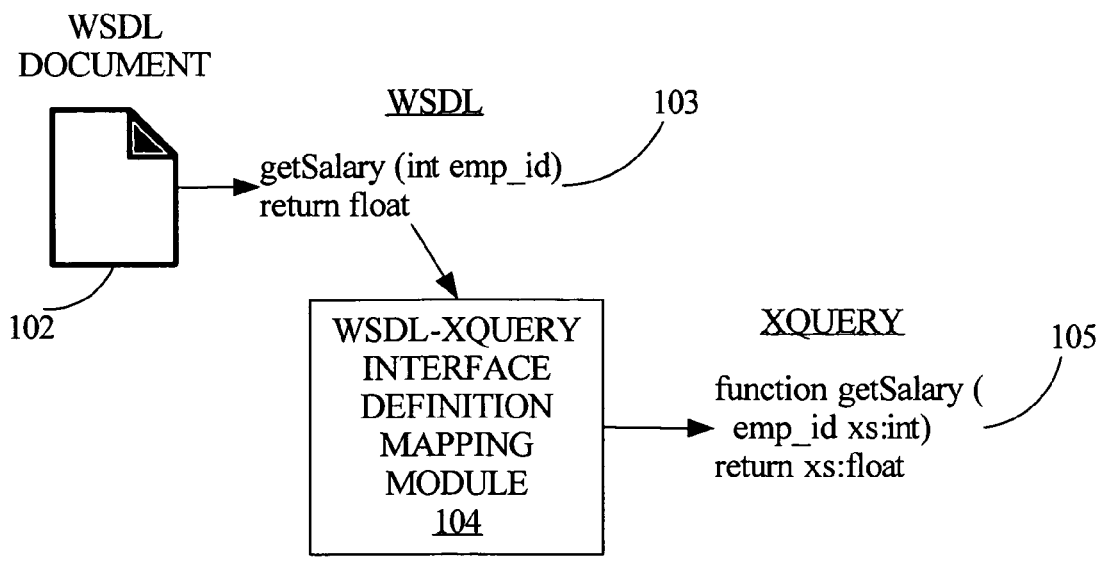
FIG. 1 is a block diagram that illustrates a functional environment in which an embodiment of the invention may be implemented.

FIG. 1 is a block diagram that illustrates a functional environment in which an embodiment of the invention may be implemented. FIG. 1 depicts a WSDL document 102, WSDL content 103, a WSDL-XQuery interface definition mapping module 104 (herein "mapping module 104"), and XQuery statement 105.

As mentioned, WSDL is an XML format for describing network services, and provides a well-defined standard for distribution and use of information contained within a WSDL document, such as WSDL document 102. The content of WSDL document 102 includes WSDL content 103. The example depicted as WSDL content 103 is an interface definition for an operation referred to as "getSalary", where the operation parameter is named "emp_id" (i.e., referring to employee identifiers) and whose data type is defined as an integer (i.e., "int"). Furthermore, WSDL content 103 defines that the data returned by execution of operation getSalary is of type "float". Hence, WSDL content 103 defines an interface to some logic that is, or can be, implemented as operation getSalary.

Note that, upon creation of WSDL document 102, there may or may not be an actual implementation existing yet for operation getSalary. In a context in which there is no actual implementation of getSalary yet developed, WSDL document 102, therefore, functions as an interface definition for the logic embodied in operation getSalary, by specifying an interface comprising an operation name (getSalary), a corresponding parameter name (emp_id) and data type (integer), and a return data type (float). Furthermore, WSDL document 102 can contain or otherwise reference (e.g., via a schema) a description of the functionality of operation getSalary, such that one could develop an implementation of the functionality of operation getSalary, in a programming language of choice.

According to one embodiment, mapping module 104 operates to automatically map WSDL content 103 to a corresponding XQuery statement 105, where XQuery statement 105 is an XQuery implementation of the interface definition of WSDL content 103. Hence, XQuery statement 105, which is generated by mapping module 104 based on WSDL content 103, is an XQuery interface definition for an interface to a function "get Salary" which corresponds to the WSDL-defined operation getSalary. Thus, XQuery statement 105 defines an interface to a function referred to as "getSalary", where the function argument is named "emp_id" and whose data type is defined as an integer. Furthermore, XQuery statement 105 defines that the data returned by execution of function getSalary is of type "float". Hence, XQuery statement 105 defines an interface to some logic that is, or can be, implemented as function getSalary. The manner in which mapping module 104 maps WSDL content to XQuery statements is described in greater detail herein.

Filling in the body of the "skeleton" XQuery statement 105 with arguments or other runtime data would then provide a method for invoking the logic of getSalary and returning the results thereof, regardless of in what language the logic is coded. Depending on what language is used to implement the logic of getSalary, calling into such logic may require runtime translation of received requests, as described in greater detail in reference to FIG. 3.

Automatic Mapping of WSDL to XQuery

Figure 2:
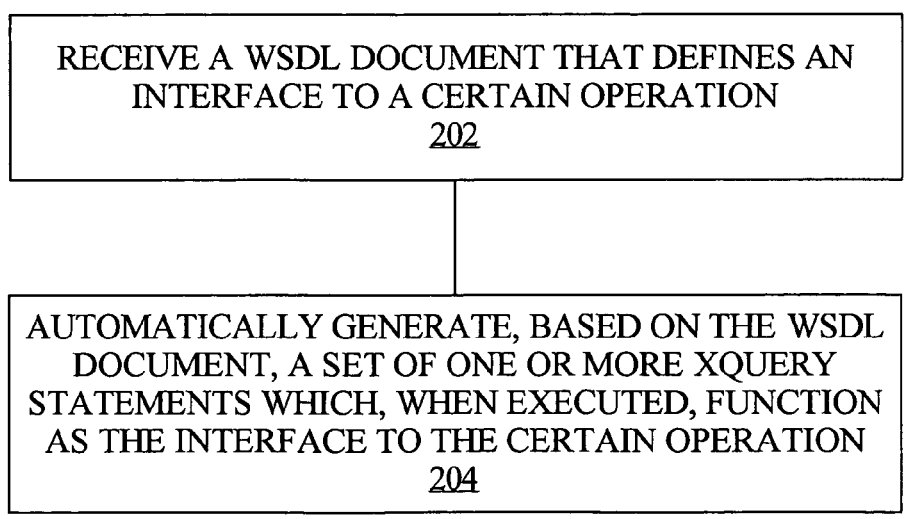
FIG. 2 is a flow diagram that illustrates a method for mapping WSDL to XQuery, according to an embodiment of the invention.

FIG. 2 is a flow diagram that illustrates a method for mapping WSDL to XQuery, according to an embodiment of the invention. The method illustrated in FIG. 2 may be performed by executing one or more sequences of instructions by one or more processors, such as within a computer system (e.g., computer system 400 of FIG. 4).

At block 202, a WSDL document is received which defines, describes, or specifies an interface to a certain operation. In this context, the WSDL document is being used as a universal interface definition document, which can be registered with a Universal Description, Discovery, and Integration (UDDI) registry, a platform-independent, XML-based registry for businesses worldwide to list themselves on the Internet, or otherwise made available to interested parties. Thus, the interested parties can access the WSDL document and interpret its contents in order to understand the specified interface to the certain operation and, perhaps, to develop some logic to implement the certain operation in a language of choice.

At block 204, based on the WSDL document, a set of one or more XQuery statements is automatically generated which function as the interface definition for the certain operation. For example, WSDL content 103 (FIG. 1) is mapped to a corresponding XQuery statement 105 (FIG. 1) via mapping module 104 (FIG. 1). Hence, the corresponding XQuery statement generated at block 204 can function as an interface definition for an exposed function that corresponds to the certain operation described in the WSDL document received at block 202.

The manner in which elements of a WSDL document map to corresponding elements of an XQuery statement, according to one embodiment, is presented in Table 1. However, WSDL-XQuery element mappings may vary from implementation to implementation and need not be precisely as depicted in Table 1.

TABLE 1

| WSDL | XQUERY |
| --- | --- |
| operation name | function name |
| operation parameter name | function argument name |
| operation parameter data type | function argument data type |
| return data type | return data type |
| WSDL namespace | XQuery namespace |
| operation namespace | function namespace |

Suppose a party is in possession of a WSDL definition and an 'empty' XQuery engine. The party could run the WSDL definition through the automated WSDL-XQuery mapping operation described herein and would now have an XQuery skeleton that defines an interface to the operation defined in the WSDL definition. If the operation is in fact implemented as an XQuery function, then the WSDL definition further serves as an interface definition for the XQuery function, which can be called using XQuery based on the WSDL interface definition.

Generally, such a WSDL-XQuery mapping operation primarily involves mapping the WSDL operations and data types to corresponding XQuery functions with functionally equivalent data types. In most cases, simple data types in WSDL (e.g., scalar types like integer, number, float, etc.) directly map to the same simple data types in XQuery because both XQuery and WSDL use the same data types. However, in some scenarios, WSDL data types may have to map to XQuery supertypes. In most cases, complex data types in WSDL map to similar complex types in XQuery, whereby complex type elements are mapped to nodes in the XQuery function. Furthermore, if the WSDL references a schema for the complex type, either inline or out of line, the schema is registered with the managing system and tied to the WSDL parameter that maps to a corresponding XQuery argument. According to one embodiment, WSDL supports annotations that allow for the distinction between scalar parameters and attribute parameters. Likewise, the complex types in the WSDL are handled in the same manner.

If mapping a WSDL definition that defines multiple operations to a corresponding XQuery module that collectively defines or implements the functionality of the multiple operations, the entire bundle of functions embodied in the XQuery module can be imported in one operation because all XQuery modules typically reside in a target namespace. For XQuery modules, there are multiple input/output elements, messages and, optionally, multiple port bindings. However, the mapping process for each function in the module is the same as described herein for a single function.

An Example Mapping Of WSDL to XQuery

An example of a WSDL definition and how it maps to a corresponding XQuery statement, according to an embodiment of the invention, is as follows. Consider the following WSDL definition for an operation "FOO", shown with line numbers for reference .purposes:

```
1    <definitions name="FOO"
2         targetNamespace="http://xmlns.oracle.com/orawsv/SCOTT/FOO"
3         xmlns="http://schemas.xmlsoap.org/wsdl/"
4         xmlns:tns="http://xmlns.oracle.com/orawsv/SCOTT/FOO"
5         xmlns:xsd="http://www.w3.org/2001/XMLSchema"
6         xmlns:soap="http://schemas.xmlsoap.org/wsdl/soap/">
7       <types>
8         <xsd:schema targetNamespace="http://xmlns.oracle.com/orawsv/SCOTT/FOO"
9             elementFormDefault="qualified">
10          <xsd:element name="SNUMBER-FOOInput">
11            <xsd:complexType>
12              <xsd:sequence>
13                <xsd:element name="A" type="xsd:double"/>
14                <xsd:element name="B" type="xsd:string"/>
15              </xsd:sequence>
16            </xsd:complexType>
17          </xsd:element>
18
19          <xsd:element name="FOOOutput">
20            <xsd:complexType>
21              <xsd:sequence>
22                <xsd:element name="RETURN" type="xsd:double"/>
23              </xsd:sequence>
24            </xsd:complexType>
25          </xsd:element>
26        </xsd:schema>
27      </types>
28
29      <message name="FOOInputMessage">
30        <part name="parameters" element="tns:SNUMBER-FOOInput"/>
31      </message>
32
33      <message name="FOOOutputMessage">
34        <part name="parameters" element="tns:FOOOutput"/>
35      </message>
36      <portType name="FOOPortType">
37        <operation name="FOO">
38          <input message="tns:FOOInputMessage"/>
39          <output message="tns:FOOOutputMessage"/>
40        </operation>
41      </portType>
42
43      <binding name="FOOBinding"
44               type="tns:FOOPortType">
45        <soap:binding style="document"
46   transport="http://schemas.xmlsoap.org/soap/http"/>
47        <operation name="FOO">
48          <soap:operation soapAction="FOO"/>
49          <input>
50            <soap:body parts="parameters" use="literal"/>
51          </input>
52          <output>
53            <soap:body parts="parameters" use="literal"/>
54          </output>
55        </operation>
56      </binding>
57
58      <service name="FOO">
59        <documentation>Oracle Web Service</documentation>
60        <port name="FOOPort" binding="tns:FOOBinding">
61          <soap:address
62                  location="http://stacp28:2111/orawsv/SCOTT/FOO"/>
63   </port>
64      </service>
65    </definitions>
```

The foregoing WSDL definition for the operation "FOO" includes input and output definitions, SNUMBER-FOOInput (line 10+) and FOOOutput (line 19+) respectively. For FOO-Input, corresponding parameter names and types are defined: element A as type double and element B as type string (lines 13-14). For FOOOutput, corresponding parameter names and types are defined: RETURN of type double (line 22). The WSDL definition also defines how to invoke the service implementation of operation "FOO" by describing the content, port type, and bindings for input and output messages, FOOInputMessage and FOOOutputMessge respectively, at lines 29-65. The WSDL definition for the operation "FOO" also includes a schema target namespace (line 8), which is discussed in greater detail hereafter.

According to one embodiment, a corresponding XQuery statement is generated by mapping elements from the WSDL definition to corresponding elements of the XQuery statement. Based on the foregoing WSDL definition for operation FOO, a corresponding XQuery statement in simplified form is as follows:

```
declare function FOO($A as xsd:double, $B as xsd:string) as xsd:double
{
  ; // body of the XQuery function..
};
``` where the WSDL operation name "FOO" maps to the corresponding XQuery function name "FOO"; parameter names "A" and "B" and parameter types for A (double) and B (string) map to corresponding arguments and argument types for the XQuery function FOO, "$A as xsd:double" and "$B as xsd: string" respectively; and the return type (double) maps to the corresponding return type, "as xsd: double". The body of an XQuery function implementation corresponding to the WSDL operation is not shown in the foregoing XQuery statement. However, one skilled in the art will recognize that the necessary information is provided in the WSDL definition, including the various links to (e.g., to target and schema target namespaces), in order to develop a function FOO in a programming language of choice, including XQuery.

The foregoing mapping of a WSDL operation and invocation definition to a corresponding XQuery function and invocation definition provides a general example of how a WSDL definition can be used as an application programming interface definition for a function that can be implemented in the XQuery language, using the well-defined standard of WSDL for ease of distribution and use.

A non-limiting example of one use case is for a system architect to define an application A based on a WSDL document W, where there is not yet a back-end implementation of application A developed. The architect could pass the WSDL document to application developers to function as an interface definition for application A. Thus, the developers could decide that the functionality that the architect wants exposed by an implementation of application A will be developed in XQuery, and can use the automated WSDL-XQuery mapping technique described herein to convert the WSDL document to a corresponding XQuery statement.

Another non-limiting example of one use case is in the context of a party wanting to call into some common functionality on multiple different databases. The party should not have to change the calling code for calling into the common functionality on each of the multiple databases. Thus, the party can generate a WSDL document that defines the common functionality into which they want to call, and tell the application developers to base their application embodying the common functionality on the WSDL document. Consequently, the party is ensured that common calling code can be used to access the functionality across the multiple databases.

Figure 3:
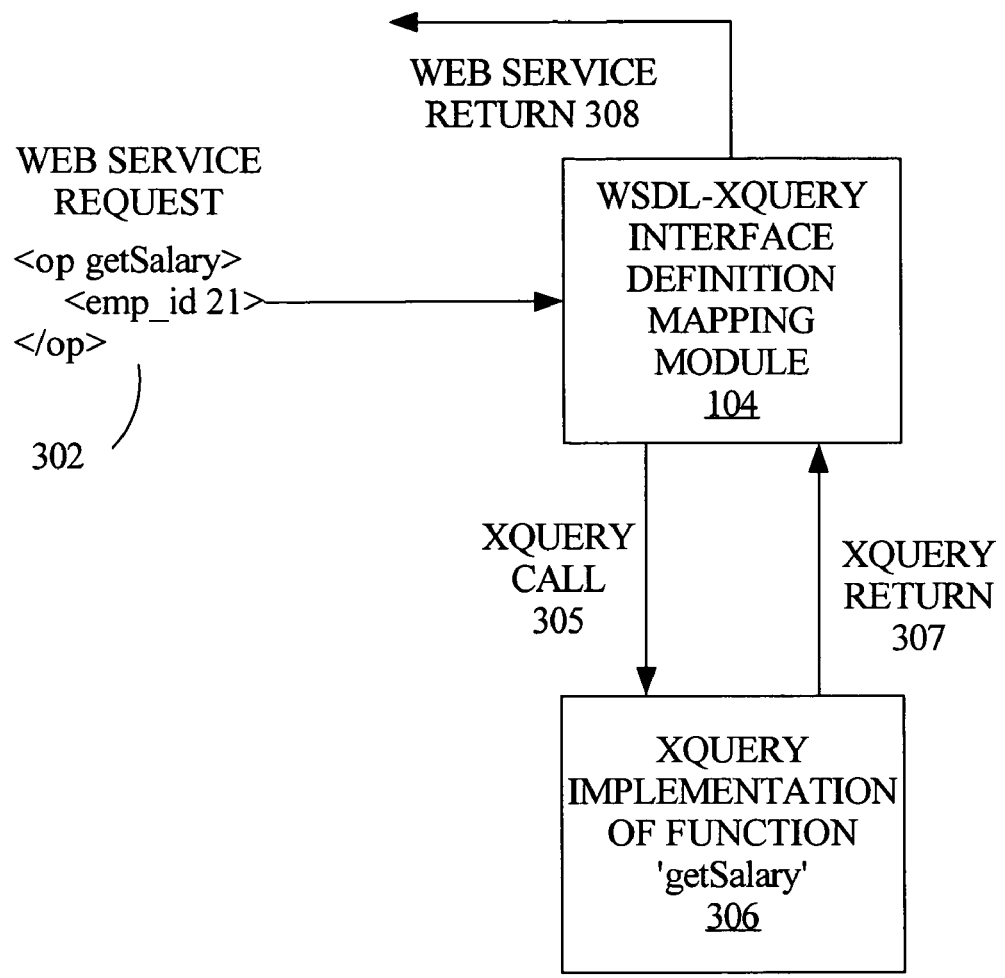
FIG. 3 is a block diagram that illustrates a functional environment in which an embodiment of the invention may be implemented.

Another non-limiting example of a use of the described WSDL-XQuery mapping technique involves an XQuery implementation of a function corresponding to an operation defined in a WSDL definition. FIG. 3 is a block diagram that illustrates a functional environment in which an embodiment of the invention may be implemented. FIG. 3 depicts a Web Service request 302, the WSDL-XQuery interface definition mapping module 104, an XQuery call 305 to an XQuery implementation 306, an XQuery return 307, and a Web Service return 308.

Request 302 depicts a request for a Web Service getSalary, which takes as input a value for emp_id. Request 302 is formulated based on a WSDL definition document, such as WSDL document 102 (FIG. 1). According to one embodiment, request 302 is routed to mapping module 104 for translation into an XQuery call 305 into an XQuery implementation 306 of function getSalary. Execution of the XQuery implementation 306 outputs XQuery return 307. XQuery return 307 is routed to mapping module 104 for translation into Web Service return 308 in the appropriate return format defined in the WSDL, and then returned to the requestor.

Hence, mapping module 104 can be (1) configured to convert a WSDL-based application interface definition into an XQuery-based application interface definition, as described in reference to FIG. 1 and FIG. 2; and (2) configured to convert a Web Service request in a form as defined in a WSDL document to an XQuery-based direct call into an XQuery implementation of the Web Service defined in the WSDL document, as described in reference to FIG. 3. On one hand, Web Services and Service-Oriented Architecture (SOA) generally, are becoming industry standards for business solution design and deployment. On the other hand, XQuery can be run in a mid-tier as well as in a database. Thus, the techniques described herein tie together these two powerful entities and enables users to move seamlessly between the two.

Hardware Overview

Figure 4:
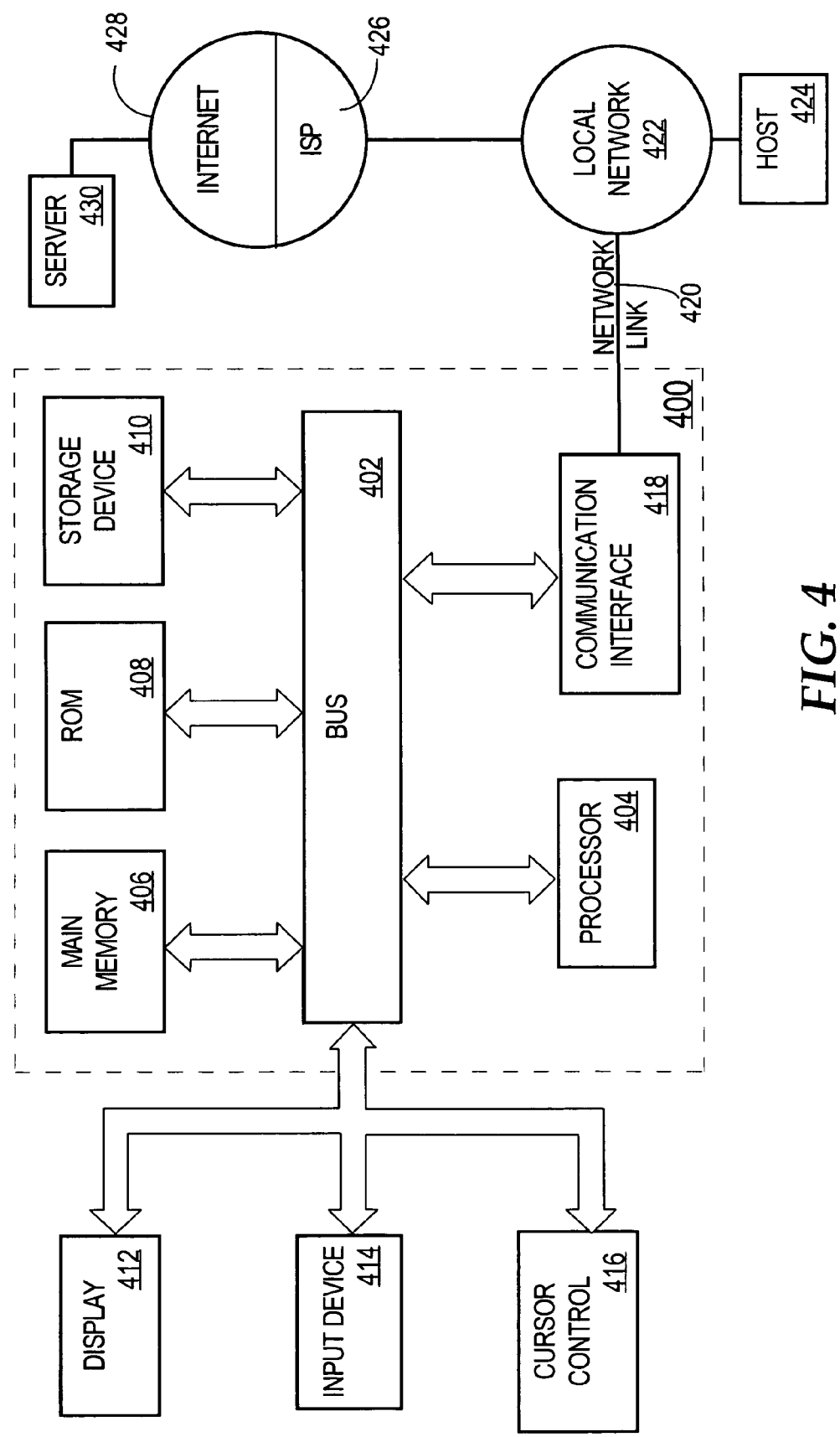
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media.

Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving a Web Services Description Language (WSDL) definition that defines an interface to a certain operation that is not yet implemented on a server; and
   automatically generating, based on said WSDL definition, a set of one or more XQuery statements as an XQuery skeleton that defines said interface to said certain operation, wherein the certain operation is not yet implemented on the server;
   causing the certain operation to be implemented on the server by receiving a body of the one or more XQuery statements as implementation logic that fills in the XQuery skeleton to implement the certain operation on the server;
   wherein the method is performed by one or more computing devices.

2. The method of claim 1, wherein said generating comprises:
   automatically mapping an operation name associated with said certain operation in said WSDL definition to a corresponding XQuery function name.

3. The method of claim 1, wherein said generating comprises:
   automatically mapping a plurality of operation names associated with respective operations referenced in said WSDL definition to corresponding XQuery function names bundled in an XQuery module.

4. The method of claim 1, wherein said generating comprises:
   automatically mapping an operation name associated with said certain operation in said WSDL definition to a corresponding XQuery function name; and
   automatically mapping a parameter name associated with said certain operation in said WSDL definition to a corresponding XQuery function argument name.

5. The method of claim 1, wherein said generating comprises:
   automatically mapping an operation name associated with said certain operation in said WSDL definition to a corresponding XQuery function name;
   automatically mapping a parameter name associated with said certain operation in said WSDL definition to a corresponding XQuery function argument name; and automatically mapping a parameter data type associated with said parameter in said WSDL definition to a corresponding XQuery function argument data type.

6. The method of claim 1, wherein said generating comprises:
automatically mapping a complex data type in said WSDL definition to a similar complex data type in said one or more XQuery statements, wherein an element associated with said complex data type in said WSDL definition is mapped to a corresponding node referenced in said one or more XQuery statements.

7. The method of claim 1, wherein said generating comprises:
automatically mapping a return data type defined in said WSDL definition to a corresponding XQuery return data type.

8. The method of claim 1, wherein said generating comprises:
automatically mapping a WSDL namespace referenced in said WSDL definition to a corresponding XQuery module namespace.

9. The method of claim 1, wherein said generating comprises:
automatically mapping a namespace associated with said certain operation in said WSDL definition to a corresponding namespace associated with an XQuery function corresponding to said certain operation.

10. The method of claim 1, wherein said instructions include instructions which, when executed by one or more processors, cause the one or more processors to perform the steps of:
reading from said WSDL definition a reference to an XML schema associated with a data type definition;
registering said XML schema with a database system;
wherein said generating comprises automatically generating a reference to said XML schema in association with an argument type corresponding to an XQuery function corresponding to said certain operation.

11. The method of claim 10, wherein said XML schema defines a complex data type, and wherein an element associated with said complex data type in said WSDL definition is mapped to a corresponding node referenced in said one or more XQuery statements.

12. The method of claim 1, wherein said instructions include instructions which, when executed by one or more processors, cause the one or more processors to perform the steps of:
receiving a Web Service request for performing said certain operation, wherein said Web Service request conforms to said WSDL definition;
automatically translating said Web Service request into a call to an XQuery function corresponding to said certain operation; and
returning, as a Web Service return that conforms to said WSDL definition, a result of performing said XQuery function corresponding to said certain operation.

13. One or more non-transitory computer-readable storage media storing instructions which, when executed by one or more processors, cause the one or more processors to perform:
receiving a Web Services Description Language (WSDL) definition that defines an interface to a certain operation that is not yet implemented on a server; and
automatically generating, based on said WSDL definition, a set of one or more XQuery statements as an XQuery skeleton that defines said interface to said certain operation, wherein the certain operation is not yet implemented on the server;
causing the certain operation to be implemented on the server by receiving a body of the one or more XQuery statements as implementation logic that fills in the XQuery skeleton to implement the certain operation on the server.

14. The one or more non-transitory computer-readable storage media of claim 13, wherein said one or more processors perform the step of generating by automatically mapping an operation name associated with said certain operation in said WSDL definition to a corresponding XQuery function name.

15. The one or more non-transitory computer-readable storage media of claim 13, wherein said one or more processors perform the step of generating by automatically mapping a plurality of operation names associated with respective operations referenced in said WSDL definition to corresponding XQuery function names bundled in an XQuery module.

16. The one or more non-transitory computer-readable storage media of claim 13, wherein said one or more processors perform the step of generating by:
automatically mapping an operation name associated with said certain operation in said WSDL definition to a corresponding XQuery function name; and
automatically mapping a parameter name associated with said certain operation in said WSDL definition to a corresponding XQuery function argument name.

17. The one or more non-transitory computer-readable storage media of claim 13, wherein said one or more processors perform the step of generating by:
automatically mapping an operation name associated with said certain operation in said WSDL definition to a corresponding XQuery function name;
automatically mapping a parameter name associated with said certain operation in said WSDL definition to a corresponding XQuery function argument name; and
automatically mapping a parameter data type associated with said parameter in said WSDL definition to a corresponding XQuery function argument data type.

18. The one or more non-transitory computer-readable storage media of claim 13, wherein said one or more processors perform the step of generating by automatically mapping a complex data type in said WSDL definition to a similar complex data type in said one or more XQuery statements, wherein an element associated with said complex data type in said WSDL definition is mapped to a corresponding node referenced in said one or more XQuery statements.

19. The one or more non-transitory computer-readable storage media of claim 13, wherein said one or more processors perform the step of generating by automatically mapping a return data type defined in said WSDL definition to a corresponding XQuery return data type.

20. The one or more non-transitory computer-readable storage media of claim 13, wherein said one or more processors perform the step of generating by automatically mapping a WSDL namespace referenced in said WSDL definition to a corresponding XQuery module namespace.

21. The one or more non-transitory computer-readable storage media of claim 13, wherein said one or more processors perform the step of generating by automatically mapping a namespace associated with said certain operation in said WSDL definition to a corresponding namespace associated with an XQuery function corresponding to said certain operation.

22. The one or more non-transitory computer-readable storage media of claim 13, wherein the instructions, when executed by the one or more processors, further cause the one or more processors to perform:
- reading from said WSDL definition a reference to an XML schema associated with a data type definition;
- registering said XML schema with a database system;
- wherein said generating comprises automatically generating a reference to said XML schema in association with an argument type corresponding to an XQuery function corresponding to said certain operation.

23. The one or more non-transitory computer-readable storage media of claim 22, wherein said XML schema defines a complex data type, and wherein an element associated with said complex data type in said WSDL definition is mapped to a corresponding node referenced in said one or more XQuery statements.

24. The one or more non-transitory computer-readable storage media of claim 13, wherein the instructions, when executed by the one or more processors, further cause the one or more processors to perform:
- receiving a Web Service request for performing said certain operation, wherein said Web Service request conforms to said WSDL definition;
- automatically translating said Web Service request into a call to an XQuery function corresponding to said certain operation; and
- returning, as a Web Service return that conforms to said WSDL definition, a result of performing said XQuery function corresponding to said certain operation.

* * * * *

UNITED STATES PATENT AND TRADEMARK OFFICE
CERTIFICATE OF CORRECTION

| | | |
|---|---|---|
| PATENT NO. | : 7,945,893 B2 | Page 1 of 1 |
| APPLICATION NO. | : 11/545932 | |
| DATED | : May 17, 2011 | |
| INVENTOR(S) | : Angrish et al. | |

It is certified that error appears in the above-identified patent and that said Letters Patent is hereby corrected as shown below:

In column 4, line 67, delete ".purposes:" and insert -- purposes: --, therefor.

Signed and Sealed this
Eleventh Day of October, 2011

David J. Kappos
*Director of the United States Patent and Trademark Office*